United States Patent [19]
Sakagami et al.

[11] Patent Number: 5,384,765
[45] Date of Patent: Jan. 24, 1995

[54] AUTOMOBILE MULTIPLEX DATA COMMUNICATION SYSTEM INCLUDING FAIL-SAFE FUNCTION FOR LAN COMMUNICATION NETWORK

[75] Inventors: Atsushi Sakagami, Yokohama; Shizuhisa Watanabe; Kazumasa Sugiura, both of Katsuta; Shigeru Oho, Hitachi, all of Japan

[73] Assignee: Nissan Motor Co., Ltd., Yokohama, Japan

[21] Appl. No.: 37,116

[22] Filed: Mar. 23, 1993

[30] Foreign Application Priority Data

Mar. 23, 1992 [JP] Japan .................. 4-065177

[51] Int. Cl.$^6$ .................. G08B 21/00; B60Q 1/00; H04J 3/14
[52] U.S. Cl. .................. 370/13; 340/602; 340/459; 370/85.1
[58] Field of Search ............... 340/457.2, 458, 438, 340/459, 464, 600, 601, 602, 870.13, 870.14; 370/85.1, 85.9, 85.11, 13, 16; 371/8.2, 11.2

[56] References Cited

U.S. PATENT DOCUMENTS

| | | | |
|---|---|---|---|
| 4,665,351 | 5/1987 | Nyberg | 340/602 |
| 4,841,520 | 6/1989 | Steely | 370/85.1 |
| 4,931,767 | 6/1990 | Albrecht et al. | 340/602 |
| 5,121,386 | 6/1992 | Wolfsgraber et al. | 370/85.1 |
| 5,203,207 | 4/1993 | Sugiyama | 340/602 |

*Primary Examiner*—Wellington Chin
*Attorney, Agent, or Firm*—Foley & Lardner

[57] ABSTRACT

In an automobile multiplex data communication system (1000), a fail-safe function is established without providing a specific function switch. The automobile multiplex data communication system (1000) includes: transmission means (3:11:101:901) for transmitting operation data about a plurality of operation units (2a:106:204:704) provided with a plurality of terminal units (1a:202:602:902) corresponding thereto, which are required to operate an automobile; drive means (4:420) for driving a relevant terminal unit (1a:202:602:902) in response to said operation data; detecting means (5:410) for detecting an extraordinary state concerning transmission/reception operations of said operation data to produce an extraordinary-state detection signal; and control means (6:12) for independently controlling the operation of said relevant terminal unit (1a:202:602:902) by AND-gating said extraordinary-state detection signal and each of operation outputs derived from said operation units.

7 Claims, 7 Drawing Sheets

ERR = 0 : NORMAL STATE
ERR = 1 : ABNORMAL STATE

|  |  | In | On | An (=Bn) ERR=0 | An (=Bn) ERR=1 |
|---|---|---|---|---|---|
| HEADLAMP SWITCH | ON | 1 | 1 | 1 | 1 |
| HEADLAMP SWITCH | OFF | 0 | 0 | 0 | 0 |
| WIPPER SWITCH | ON | 1 | 1 | 1 | 1 |
| WIPPER SWITCH | OFF | 0 | 0 | 0 | 0 |
| HORN SWITCH | ON | 1 | 1 | 1 | 0 |
| HORN SWITCH | OFF | 0 | 0 | 0 | 0 |

103
109
106

AUTOMOBILE MULTIPLEX DATA COMMUNICATION SYSTEM INCLUDING FAIL-SAFE FUNCTION FOR LAN COMMUNICATION NETWORK

BACKGROUND OF THE INVENTION

1. Field of the Invention

The present invention generally relates to an automatic multiplex data communication system for transmitting operation data about a large quantity of operation members such as head lamps via a small number of transmission lines to a main control unit. More specifically, the present invention is directed to an automobile multiplex data communication system including a low-cost fail-safe function with respect to fails occurring in a LAN communication network.

2. Description of the Prior Art

Various electronic components and signal processing methods have been developed for automobiles. To electrically communicate a large number of electronic terminals (components, sensors, displays) with a main control unit, a large quantity of wire harness iS required. However, such a wire harness may cause problems of heavy weights and deterioration of system reliabilities.

To eliminate heavy wire harness, LAN (local area network) communication systems are utilized in automobile communication systems.

Very recently, a so-called "multiplex data communication system" has been gradually utilized in certain automobiles, in which various operation data about a large number of operation members such as brake lamps and power-window switches are transmitted via a small number of multiplex transmission line between a main (parent) station and child stations with such operation members. In the multiplex data communication system, generally speaking, the operation information or data of the operation members, e.g., switches connected to these child stations, is transmitted between the child stations and the parent station. Accordingly, the parent station can detect the operation conditions of these respective operation members based upon the operation information. Then, upon detection of changes in the operation conditions, the parent station sends drive information or data via the multiplex transmission line to the relevant child station to which the terminal unit is connected, so that this terminal unit can be driven under control of the parent station. When the above-described operation information about various operation units is transmitted/received to/from the parent station, if the signal communication lines (LAN) would be disconnected, or the signals would be adversely influenced by receiving electromagnetic noises, such a communication error (erroneous information) is detectable by performing the parity bit check, so that the fail-safe function of this system can be done.

Figure 1:
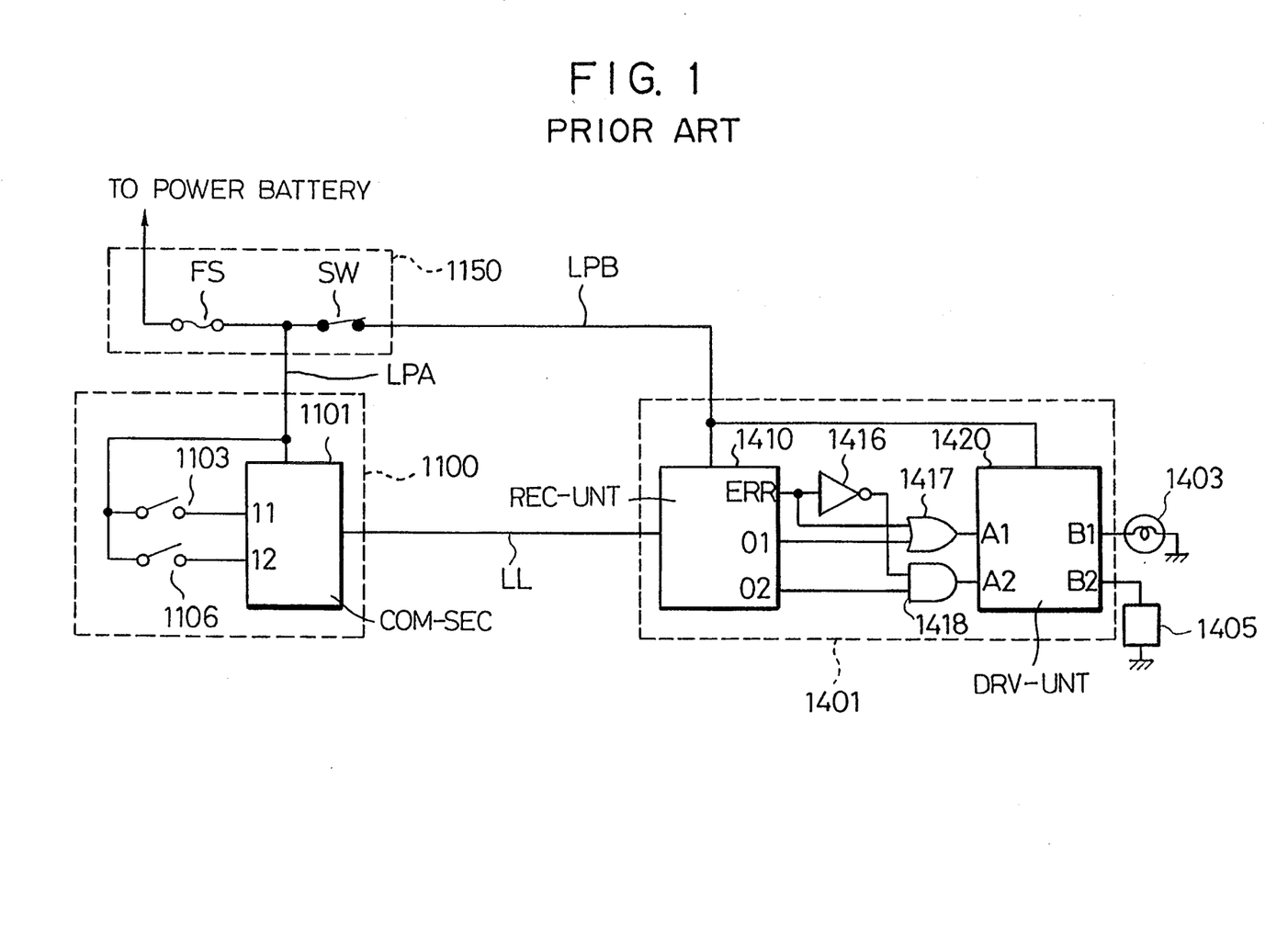
FIG. 1 schematically shows a circuit arrangement of the conventional automobile multiplex data communication system.

As to the conventional fail-safe function, a more detailed described will now be explained with reference to FIG. 1. FIG. 1 represents a major circuit arrangement of the conventional automobile communication system equipped with the fail-safe function.

In the conventional automobile communication system, a fuse box 1150 is arranged by a fuse "FS" and a switch "SW". A voltage of a power source (battery, not shown in detail) is applied via this fuse "FS" and a power source line "LPA" to a child station 1100 and also via another power source line "LPB" to a communication unit 1401. This power source line LPA is also used to connect this child station 1100 with a parent station (not shown) and many other child stations. Since this switch SW is of a normally-close type switch, the power supply voltage is normally applied to the communication units of the plural child stations. The communication unit 1401 is constructed of a signal receiving unit 1410, an inverter circuit 1416, an OR gate circuit 1417, an AND gate circuit 1418, and a drive unit 1420.

In this automobile communication system shown in FIG. 1, for instance, when one power source line "LPB" is disconnected, and then the parity bit becomes an even bit, it can be judged that a so-called "communication error" happens to occur. As a result, a logic value "1" is outputted from an error terminal "ERR" of the signal receiving unit 1410. This error logic signal having the signal level of "1" is supplied via the OR gate circuit 1417 to an input terminal "A1" of the drive unit 1420. Thus, a logic signal having a level of "1" is outputted from an output terminal "B1" of the drive unit 1420, thereby causing a headlamp 1403 to be forcibly turned ON. (lightening).

As described above, in case that such a communication error happens to occur, the preselected terminal unit such as the headlamp 1403 is compulsorily turned ON and this compulsory turn-ON condition is continued. Accordingly, for instance, when driving operation is accomplished, such a compulsory turn-ON state must be released, namely the headlamp 1403 must be turned OFF. In this case, since a car driver manipulates the switch "SW" of the fuse box 1150 to cut out the power supply from the battery to the communication unit 1401 of this child station, the headlamp 1403 which has been compulsorily turned ON, can be turned OFF.

As described above, in the conventional automobile multiplex data communications system, the specific switch "SW" must be employed to turn OFF the headlamp 1403 which has been forcibly turned ON during the occurrence of such a communication error. This may cause high manufacturing cost of this communication system. Moreover, every car driver must manipulate such a specific switch provided in the fuse box 1150 only when the communication errors happen to occur. A cumbersome switch operation is required.

On the other hand, according to another conventional communication system, when a communication error happens to occur, such a control arrangement that the supply of power to the communication unit is controlled by either the parent station, or the relevant children station, has been proposed.

However, in the latter conventional automobile multiplex data communication system, since all of the child stations are wholly power-controlled by the parent station, or the relevant children station, there are some risks that the respective terminal units cannot be separately controlled.

SUMMARY OF THE INVENTION

The present invention has been made in an attempt to solve the above-described problems, and, therefore, has an object to an automobile multiplex data communication system capable of performing a separate control of terminal units such as a headlamp.

Another object of the present invention is to provide low-cost automobile multiplex data communication system with a better operability in case of a communication error.

To achieve the above-described objects, an automobile multiplex data communication system (1000:2000), according to one aspect of the present invention, comprises:

transmission means (3:11:101:901) for transmitting operation data about a plurality of operation units (2a:106:204:704) provided with a plurality of terminal units (1a:202:602:902) corresponding thereto, which are required to operate an automobile;

drive means (4:420) for driving a relevant terminal unit (1a:202:602:902) in response to said operation data;

detecting means (5:410) for detecting an extraordinary state concerning transmission/reception operations of said operation data to produce an extraordinary-state detection signal; and control means (6:12) for independently controlling the operation of said relevant terminal unit (1a:202:602:902) by AND-gating said extraordinary-state detection signal and each of operation outputs derived from said operation units.

DETAILED DESCRIPTION OF THE PREFERRED EMBODIMENTS

Basic Idea

Before describing various preferred embodiments, a basic idea of an automobile multiplex data communication system according to the present invention will now be summarized.

Figure 2:
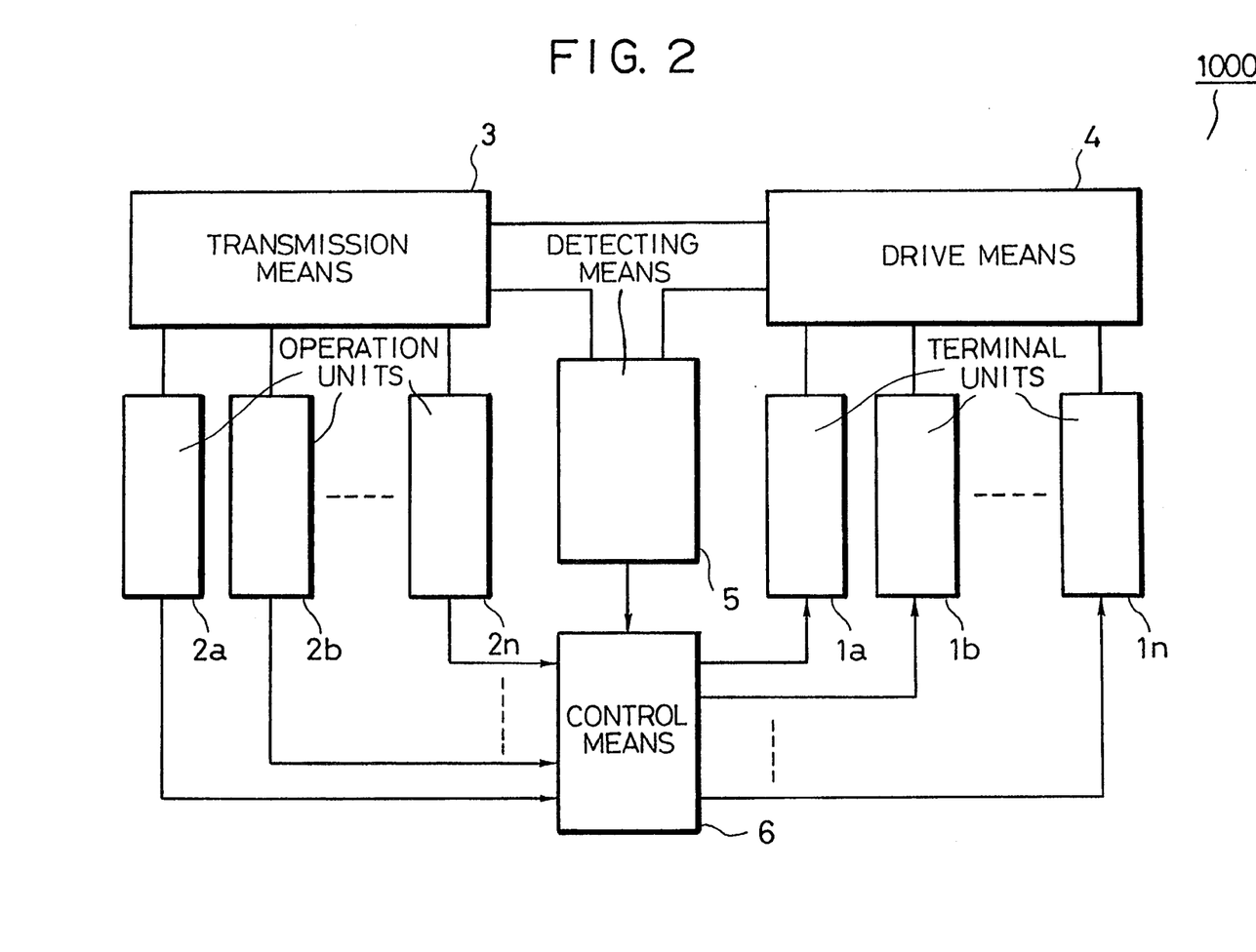
FIG. 2 is an explanatory diagram for representing a basic idea of the present invention.

FIG. 2 schematically shows an arrangement of this basic automobile multiplex data communication system 1000. This automobile multiplex data communication system 1000 includes a plurality of terminal units "1a" to "1n" (symbol "n" being an integer greater than 1) such as a headlamp; a plurality of operation units "2a" to "2n" corresponding to the plural terminal units "1a" to "1n"; and a transmission means 3 for transmitting operation information (e.g., ON/OFF control signals) to the respective operation units "2a" to "2n". Furthermore, there are provided a drive means 4 for driving the relevant terminal unit "1a", "1b", —, or "1n" in response to the operation information transmitted from the transmission means 3; a detecting means 5 for detecting an extraordinary state related to the data (signal) transmission/reception, for example, a disconnection of a signal transmission line; and a control means 6 for separately controlling an operation of the relevant terminal unit "1a", "1b", —, or "1n" based upon an AND-gated output obtained from the detection output of the detecting means 5 and the operation output of the relevant operation unit.

In the above-explained basic automobile multiplex data communication system 1000 shown in FIG. 2, when the transmission means 3 transmits the operation information, or signal (e.g., ON/OFF states) of the respective operation units "2a", —, "2n", the drive means 4 receives this operation information and then drives the relevant terminal units "1a", "1b", —, or "1n". If the detection means 5 detects an extraordinary state concerning the signal (data) transmission and/or the signal reception, the control means 6 AND-gates the detection output from the detecting means 5 and the operation output from the relevant operation unit "2a", "2b", —, or "2n", and then controls the operation of this terminal unit based on the AND-gated output. For instance, while a disconnection occurring in the signal (data) transmission line is detected by the detecting means 5, the control means 6 compulsorily turns ON only the headlamp by receiving the AND-gated output between this disconnection information and the operation information of this headlamp, when the headlamp switch (operation unit) is turned ON. Also, under such a condition that such a communication error (i.e., line disconnection) happens to occur, when the headlamp switch is turned OFF, the control means 6 can turn OFF the headlamp.

As a consequence, in accordance with the basic idea of the present invention, no specific switch for turning OFF the headlamp or other terminal units which has been forcibly turned ON due to the occurrence of the communication error, is required. Therefore, the manufacturing cost of the basic automobile multiplex data communication system 1000 can be reduced and also the operabilities thereof can be improved, while the respective terminal units can be separately controlled.

Overall Arrangement of First Automobile Multiplex Data Communication System

Figure 3A:
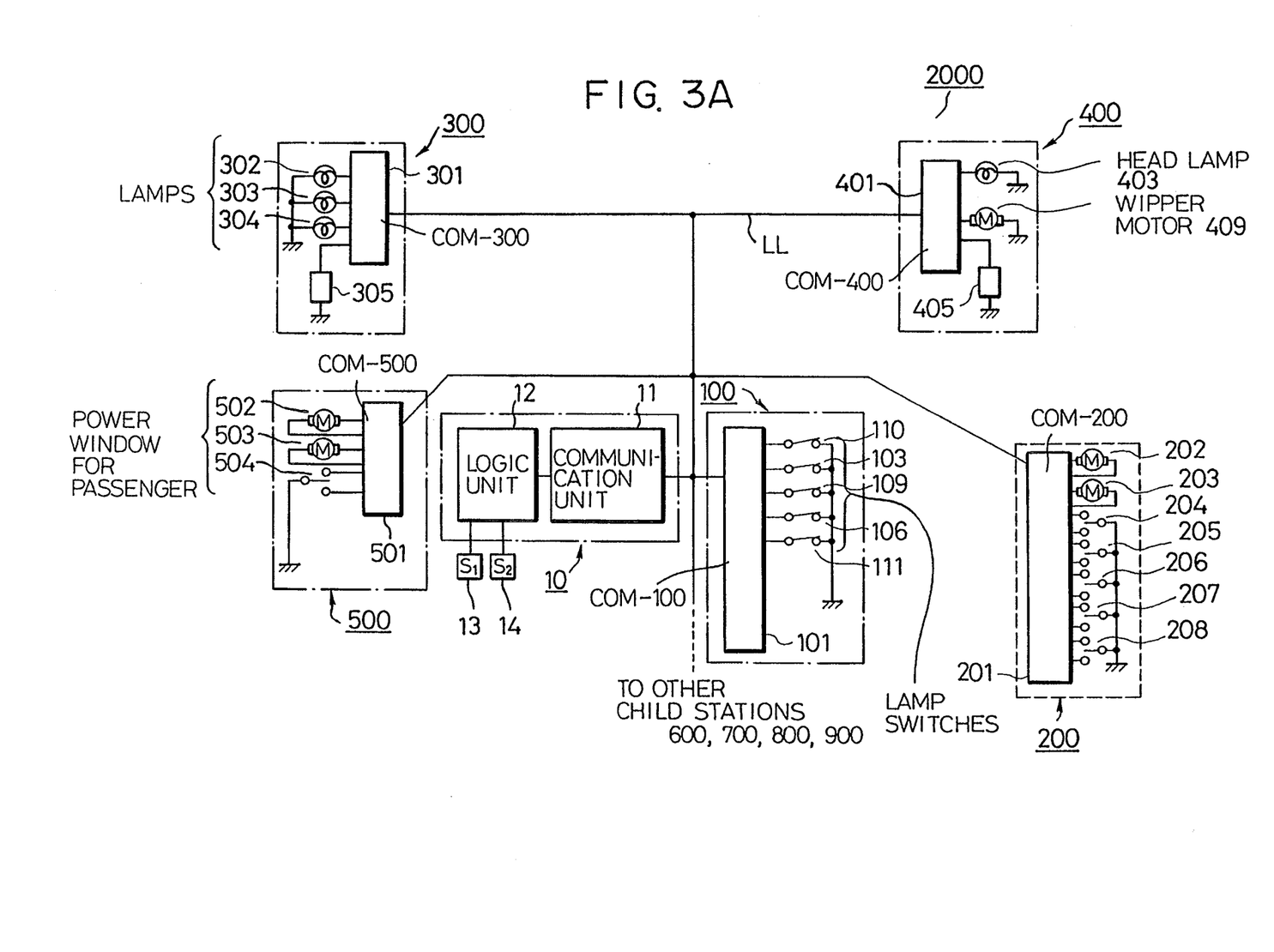
FIGS. 3A and 3B schematically represent an overall arrangement of an automobile multiplex data communication system according to a first preferred embodiment of the present invention.
Figure 3B:
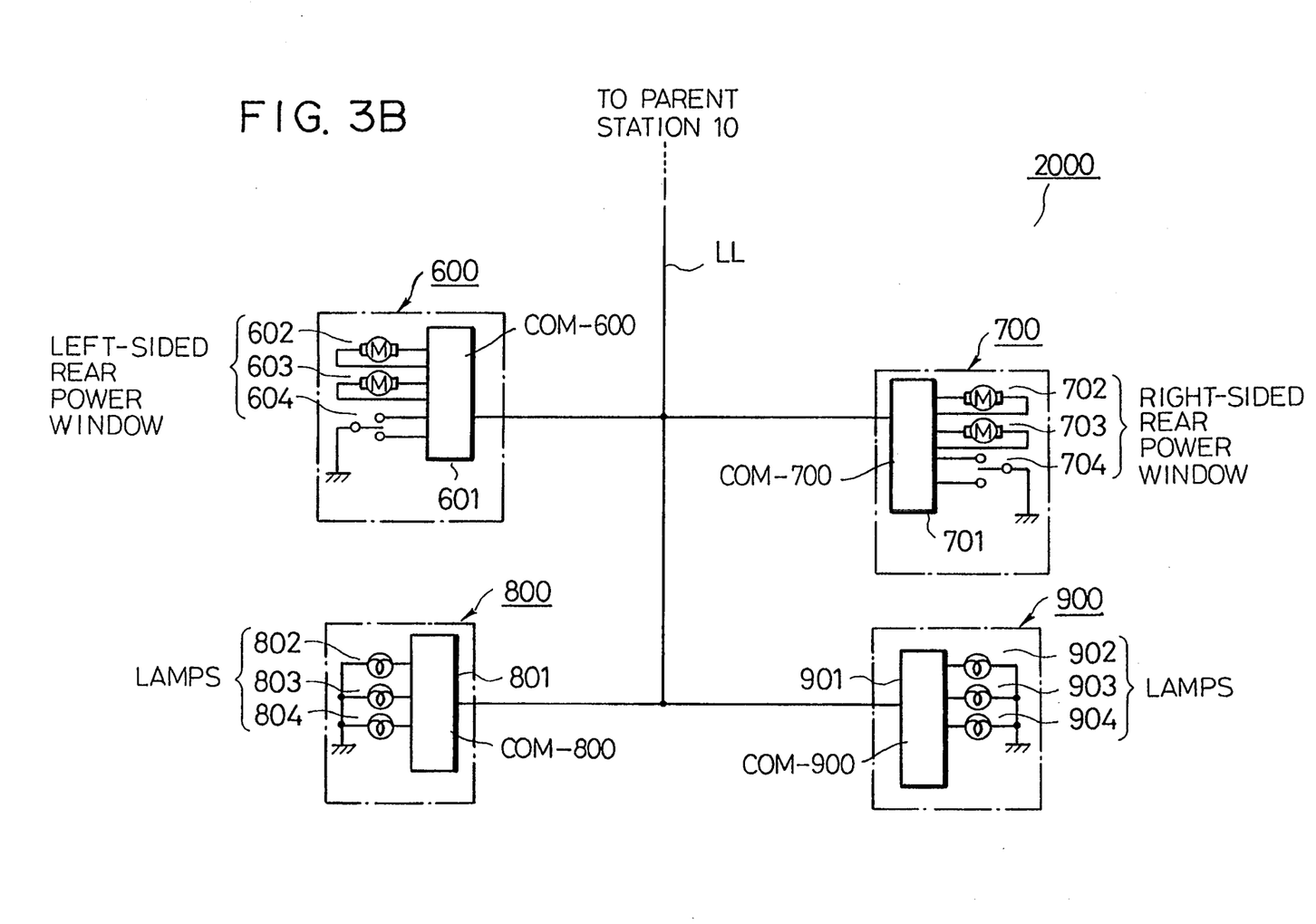

Referring now to FIGS. 3A and 3B, an overall arrangement of an automobile multiplex data communication system 2000 according to a first preferred embodiment of the present invention. This first automobile multiplex data communication system 2000 is accomplished by the above-described basic idea.

In the first automobile multiplex data communication system 2000 shown in FIGS. 3A and 3B, a plurality of child stations 100, 200, 300, 400, 500, 600, 700, 800, and 900 positioned at various places within an automobile (not shown in detail) are connected via a multiplex data transmission line "LL" to a parent station 10 positioned near a car-driver's seat (not shown either).

The parent station 10 is mainly constructed of a communication unit 11 and a logic unit 12 to which a photosensor 13 and a raindrop sensor 14 are connected. As will be described more in detail, the communication unit 11 polls these plural child stations 100 to 900 so as to establish data communications among the child stations and the parent station 10. The logic unit 12 controls the relevant terminal unit employed in the corresponding child station 100, 200, —, or 900 based on various information about operations of the relevant operation unit also employed in the child station, which has been acquired therefrom via the multiplex data transmission line "LL".

The first child station 100 is installed adjacent to the car-driver's seat. The first child station 100 includes a child communication unit 101 for establishing a communication between the parent station 10 and this first child station 100, and a plurality of operation units (switches) 103, 106, 109, 110 and 111 connected to this child communication unit 101. As these operation units, there are provided a headlamp switch 103 for turning ON/OFF a headlamp; a wiper switch 109 for turning ON/OFF a wiper; an automatic lightening switch 110 for automatically turning ON/OFF the headlamp; a horn switch 106, and an automatic wiper control switch 111 for automatically controlling the wiper.

Similarly, a second child station 200 is provided near the car-driver's seat. The second child station 200 is arranged by a communication unit 201 for establishing a communication between the parent station 10 and this child station 200, and also a plurality of operation units/communication units connected to this communication unit 201. A power window motor 202 and a door locking motor 203 are employed as the terminal units.

As these operation units, there are employed a switch 205 for opening/closing a passenger side window; a switch 206 for opening/closing a right-sided rear window; a switch 207 for opening/closing a left-sided rear window; and a door locking switch 208.

As represented in FIG. 3A, a third child station 300 is provided at a front left side of the automobile. The third child station 300 is comprised of a communication unit 301 for establishing a communication with the parent station 10, and a plurality of terminal units connected to this communication unit 301. These terminal units are a small lamp 302, a headlamp 303, a sidemarker lamp 304, and a horn 305. These terminal units are positioned at the front right side of the automobile.

A fourth child station 400 is installed at a front right side of the automobile. The forth child station 400 is arranged by a communication unit 401 for performing a communication operation with the parent station 10, and also a plurality of terminal units connected to the communication unit 401. These terminal units are a headlamp 403, a wiper motor 409, and a horn 405. The terminal units are positioned at the front right side of the automobile.

A fifth child station 500 is provided at a passenger's door of the automobile. This fifth child station 500 is constructed of a communication unit 501 for establishing a communication with the parent station 10, and a plurality of terminal units similarly provided at the passenger's door and connected to the communication unit 501, and also the corresponding operation units. As these terminal units and operation units, there are provided a power window motor 502, a door locking motor 503 and a switch 504 for opening/closing a power window.

Referring now to FIG. 3B, a sixth child station 800 is installed at a rear left-sided door of the automobile. This sixth child station 600 is arranged by a communication unit 601 for establishing a communication between the parent station 10 and this child station 600, a plurality of terminal units and corresponding operation units, which are provided at the rear left-sided door and also connected to the communication unit 801. As these terminal units and operation units, there are employed a power window motor 602, a door locking motor 603 and a power window opening/closing switch 604.

A seventh child station 700 is provided at a rear right-sided door of the automobile. The seventh child station 700 includes a communication unit 701 for establishing a communication with the parent station 10, and a plurality of terminal units and also operation units, which are similarly provided at the rear right-sided door and are connected to the communication unit 701. These terminal units and operation units are a power window motor 702, a door locking motor 703, and a power window opening/closing switch 704.

An eighth child station 800 is installed at a rear left side of the automobile. This eighth child station 800 is constructed of a communication unit 801 for establishing a communication with the parent station 10, and also a plurality of terminal units provided at the rear left side of this automobile and connected with the communication unit 801. As these terminal units, there are provided a tail lamp 802, a sidemarker lamp 803 and a license-plate lamp 804.

Furthermore, a ninth child station 900 is installed at a rear right side of the automobile. The ninth child station 900 is arranged by a communication unit 901 for executing a communication operation with the parent station 10, and a plurality of terminal units similarly provided at the rear left side are connected to the communication unit 901. These terminal units are a tail lamp 902, a sidemarker lamp 903, and a license-plate lamp 904.

Communication Data Format Employed in First Automobile Multiplex Data Communication System 2000

Figure 4A:
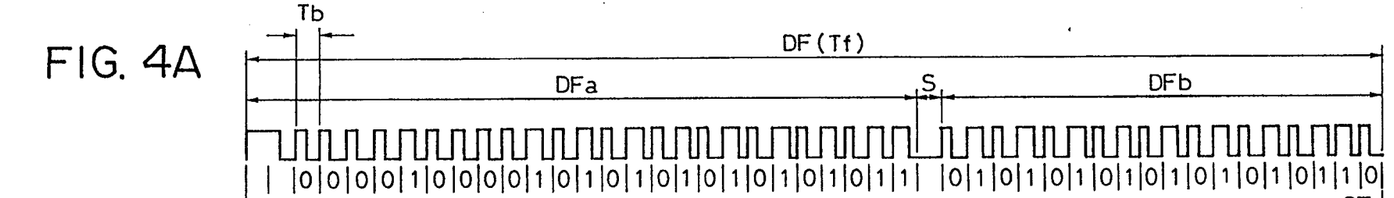
FIGS. 4A to 4C schematically indicate a data format employed in the first automobile multiplex data communication system of FIGS. 3A and 3B.
Figure 4B:
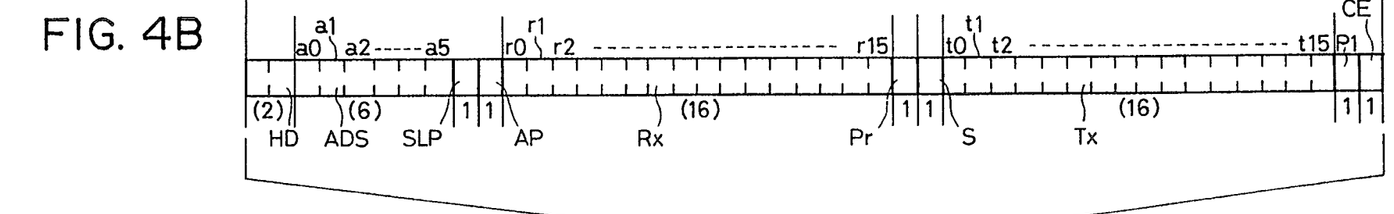
Figure 4C:
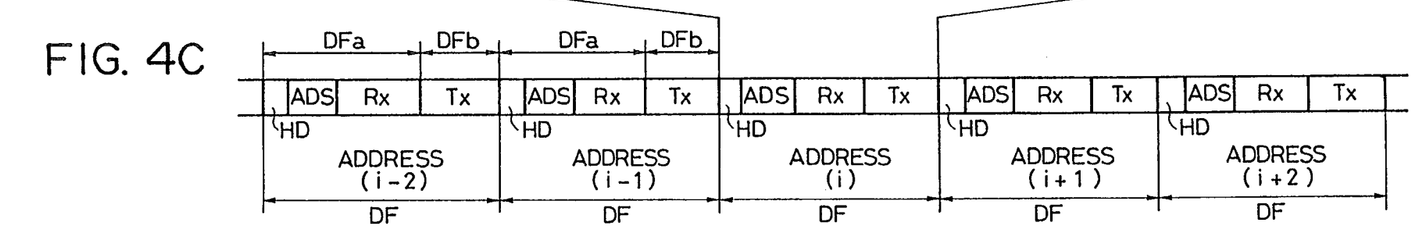

Referring now to FIG. 4, a communication data format employed in the first automobile multiplex data communication system 2000 represented in FIGS. 3A and 3B.

FIG. 4A indicates an example of communication data, FIG. 4B represents a data format with respect to one child station among the child stations having addresses (i−2), —, i, —, (i+2), and FIG. 4C shows data formats for the child stations having these addresses ADS (i−2), —, i, —, (i+2). These addresses specify the above-described child stations 100, 200, —, 900.

The parent station 10 shown in FIG. 3A designates an address of a child station for a communication purpose to produce communication data "DFa", and transmits this address ADS via the multiplex transmission line "LL" to all of the child stations 100, —, 900. The respective child stations 100, —, 900 receive the communication data DFa sent from the parent station 10, and judges whether or not the address "ADS" contained in the communication data "DFa" is coincident with the address preset to the own child station 100, —, 900. If there is a coincidence, then another communication data "DFb" is transmitted from the relevant child station via the multiplex transmission line "LL" to the parent station 10.

As shown in FIG. 4B, the first-mentioned communication data "DFa" sent from the parent station 10 to the child station, is constructed of a 2-bit header signal HD indicative of a start of data; 6-bit address information "ADS" (a0 to a5); a 1-bit sleep bit "SLP" used to stop an operation of a child station; a 1-bit parity bit "AP"; 16-bit drive information "Rx" (r0 to r15); and also 1-bit parity bit "Pr". Namely, this communication data corresponds to 27-bit data.

On the other hand, the second-mentioned communication data "DFb" sent from the child station to the parent station 10 is arranged by 18-bit operation information "Tx" (t0 to t15); a 1-bit parity bit "Pt", and a 1-bit error bit "CE".

It should be noted that communication switching time "S" for switching the communication lines set between the communication data "DFa" (sent form the parent station 10 to the child station 100, —, 900) and the communication data "DFb" (sent from the child station to the parent station), and no communication is available during this switching time "S".

As shown in FIG. 4A, a unit bit for constituting various information is produced by way of the know PWM (pulse-width modulation) method, and bit time "Tb" of the respective unit bit is set to, for instance, 70μ sec Furthermore, data time "Tf" of the data format "DF" is set to, for example, 3.5 msec.

Basic Data Communication

For a better understanding of the above-described data format communication system, one basic data communication in case that the headlamp switch 103 employed in the first child station 100 is turned ON, will now be described with reference to FIGS. 3A, 3B, and 4.

First, to acquire information about operations, the parent station 10 transmits the communication data "DFa" via the multiplex transmission line "LL" to the respective child stations 100, —, 900. This communication data DFa is constructed of the header signal "HD", the address information "ADS" of the first child station 100; the sleep bit "SLP"A, the parity bit "AP"; drive information "RX" and the parity bit "Pr". At this time the respective bits "r0" to "r15" of the drive information Rx are set to a logic value of "0", respectively whereas the parity bit "Pr" is set to a logic value of "1".

Subsequently, after the communication switching time "S" has passed (see FIG. 4A), this first child station 100 transmits the communication data "DFb" via the multiplex transmission line LL to the parent station 10. This communication data "DF6" is constructed of the operation information Tx, the parity bit Pt, and the error bit CE. At this time., in case that the information about the operation of the headlamp switch 103 corresponds to the data bit "0", this data bit "t0" is set to logic value of "0", and furthermore other data bits t1 to t5 are set to a logic value "1", respectively. Both of the parity bit "Pt" and the error bit "CE" are set to a logic value of "0", respectively.

Upon receipt of the communication data DFb sent from the first child station 100, the parent station 10 decodes the operation information Tx, and recognizes or judges that the headlamp switch 103 is turned ON, because the logic value of the data bit t0 corresponds to "0". As a consequence, the parent station 10 executes the below-mentioned process to turn ON the corresponding terminal units, namely, the small lamp 302 of the third child station 300, the small lamp 402 of the fourth child station 400; the tail lamp 802 and the license-plate lamp 804 employed in the eighth child station 800; and the tail lamp 902 and the license lamp 904 employed in the ninth child station 900.

First, the parent station 10 transmits the communication data "DFa" containing the drive information Rx for turning ON the small lamp 302 of the third child station 300. For instance, when the bit "r0" of the drive information Rx has been allocated to the small lamp 302, this bit is set to a logic value of "0", and all of the remaining bits r1 to r15 are set to a logic value "1", respectively.

When the third child station 300 receives the communication data DFa sent from the parent station 10, this third child station 300 decodes the drive information Rx contained in the communication data DFa. Upon detection of the bit "r0" being the logic value of "0", the third child station 300 judges that this instruction is to turn ON the small lamp 302, thereby turning ON this small lamp 302, when the communication switching time "S" has elapsed after the child station 300 receives the information DFa sent from the parent station 10, the child station 300 transmits the communication data "DFb" to the parent station 10. At this time, since this third child station 300 has no operation unit, the date bits t0, t1, t2, —, t15 are set to a logic value of "1", respectively.

In accordance with a similar manner to the above operation, since the parent station 10 transmits such a communication data "DFa" for turning ON the small lamp 402 to the fourth child station 400, so that the small lamp 402 is turned ON. Similarly, the parent station 10 sends such a communication data "DFa" for turning ON the tail lamp 802 and the license-plate lamp 804 to the ninth child station 800, and also transmits such a communication data DFa for turning ON both of the tail lamp 902 and the license-plate lamp 904 to the tenth child station 900.

Next, another data communication when the left-sided rear window switch 207 employed in the second child station 200 (see FIG. 3A) is manipulated, will now be explained in order to lower the left-sided rear window.

First, the parent station 10 transmits to the second child station 200, information "DFa" containing such a drive information "Rx" constructed of data bits r0, r1, r2, —r15, all logic values of which are "0" so as to demand information about operations.

As a result, when the switching time "S" has elapsed after the second child station 200 had received the information "DFa", this second child station 200 transmits to the parent station 10, another information DFb containing such as operation information "Tx" that the rear window glass switch 207 has been manipulated.

Upon receipt of the information "DFb" from the second child station 200, the parent station 10 decodes the operation information "Tx" and detects that the data bit "t7" has the logic value of "0", and therefore judges that this switch 207 has been manipulated. As a consequence, the parent station 10 transmits to the sixth child station 600, the above information "DFa" containing such a drive information "Rx" that the left-sided rear window glass is lowered. At this time, when the drive information for lowering the left-sided rear window glass has been allocated to the data bit "r1", the logic value of this data bit "r1" is set to "0" and other data bits are set to "1".

Upon reception of the information "DFa" sent from the parent station 10, the sixth child station 600 decodes the drive information "Rx" and detects that the logic value of the data bit "r1" becomes "0". Thus, this sixth child station 600 drives the power window motor 602 to lower the left-sided rear window glass. Subsequently, when the switching time "S" has passed after the information "DFa" transmitted from the information "DFa" has been received, this sixth child station 600 transmits to the parent station 10, the above-described information "DFb" containing the operation information "Tx" arranged by all of such data bits having the logic values of "1".

As previously explained in detail, the parent station 10 sequentially polls the first to the ninth child stations 100 to 900 so as to acquire the information about the operation information of these child stations, and then transmits the drive information to the relevant child station equipped with the terminal unit in response to this acquired information, so that this relevant terminal unit can be driven.

Arrangements of First/Fourth Child Stations 100/400

For a better understanding of a featured operation of the first automobile multiplex data communication system 2000, one typical operation thereof will now be explained with reference to a simple circuit arrangement shown in FIG. 5 and operation conditions of various circuit elements indicated in FIG. 6.

Figure 5:
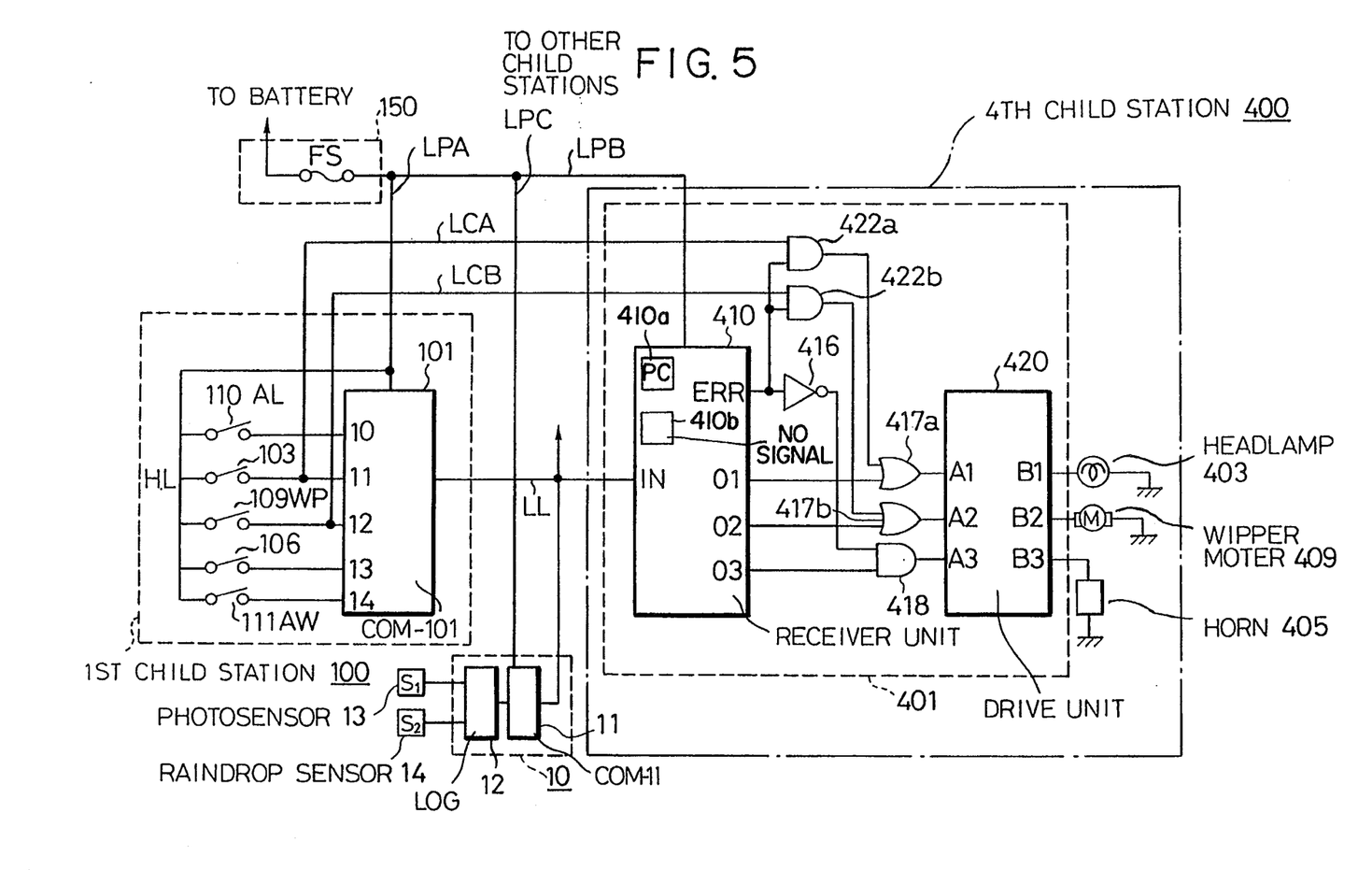
FIG. 5 schematically shows an internal circuit arrangement of a major circuit for the first automobile multiplex data communication system 2000.
Figure 6:
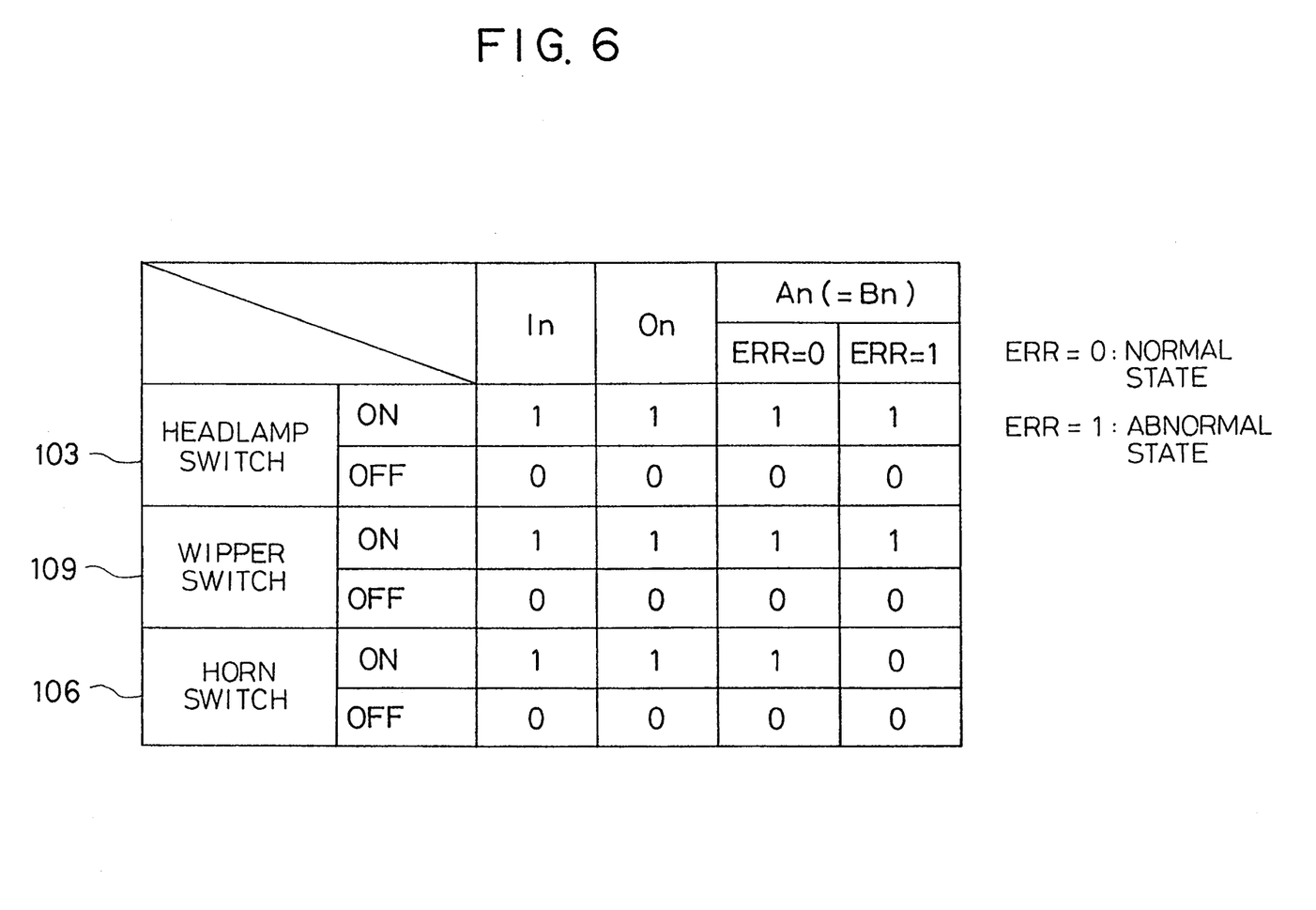
FIG. 6 shows a logic value table used to explain the communication error operations of the major circuit shown in FIG. 5.

FIG. 5 simply represents an internal arrangement of the first child station 100, an internal arrangement of the fourth child station 400, and the parent station 10.

A fuse "FS" is employed in a fuse box 150. Since this fuse "FS" is connected to a battery (not shown in detail), the power supply voltage is applied from the battery via the fuse "FS" and the power source line LPA to the first child station 100. This power source line LPA is connected to various operation units, e.g., the headlamp switch 103 and the horn switch 106 employed in the first child station 100. Furthermore, the power supply voltage is also applied via the fuse "FS" and another power source line LPB to the communication unit 401 of the fourth child station 400. Then, the power supply voltage is applied via the fuse "FS" and another power source line LPC to the parent station 10.

As described above, the parent station 10 is constructed of the communication unit 13 for establishing data communications with the respective child stations 100 to 900 by polling these child stations, and the logic unit 12 for controlling the relevant terminal unit employed in the relevant child station in accordance with the operation information acquired from the child stations via the multiplex data transmission line "LL". Furthermore, the photosensor 13 for detecting brightness around the automobile (not shown) and the raindrop sensor 14 are connected to this logic unit 12.

Concretely speaking, a plurality of operation units employed in the first child station 100 are the automatic lighting switch 110 for automatically turning ON/OFF the headlamp 403 of the fourth child station 400, the headlamp switch 103 for turning ON/OFF the head lamp 403, the wiper switch 109 for controlling the operation of the wiper motor 409 to operate the wiper, the horn switch 106 for operating the horn 405, and the automatic wiper control switch 111 for automatically controlling the operation of the wiper motor 409 to operate the wiper. These switches are connected to the input terminals I0, I1, I2, I3 and I4 of the communication unit 101, as represented in FIG. 5.

As shown in FIG. 5, the communication unit 401 of the fourth child station 400 is arranged by a signal receiver unit 410, an inverter circuit 416, OR gate circuits 417a and 417b, an AND gate circuit 418, a drive unit 420, and also AND gates 422a, 422b. The signal receiver unit 410 owns an error terminal ERR, and output terminals 01, 02, 03. An input terminal "IN" of the signal receiver unit 410 is connected via the multiple data transmission line LL to the parent station 10 and a plurality of other child stations 100, 200, —, 900. The drive unit 420 has input terminals A1, A2, A3 and output terminals B1, B2, B3. To these output terminals B1 to B3, the following terminal units are connected, namely the leadlamp 403 is connected to the first output terminal B1, the wiper motor 409 is connected to the second output terminal B2, and the horn 405 is connected to the third output terminal B3.

The above-described headlamp switch 103 employed in the first child station 100 is connected via a transmission line LCA to one input terminal of the AND gate circuit 422a. Similarly, the wiper switch 109 is connected via another transmission line LCB to the other input terminal of the AND gate circuit 422b. The remaining input terminals of these AND gate circuits 422a and 422b, and also an input terminal of an inverter circuit 416 are connected to the error terminal "ERR" of the signal receiver unit 410. Then, output terminals of the AND gate circuits 422a and 422b, and the output terminal of the inverter circuit 416 are connected to one input terminal of the respective OR gate circuits 417a, 417b, and AND gate circuit 418. The output terminals 01, 02, 03 of the signal receiver circuit 410 are connected to the other input terminal of the respective OR gate circuits 417a, 417b, and AND gate circuit 418. The output terminals of these OR gate circuits 417a, 417b, and AND gate circuit 418 are connected to the input terminals A1, A2, A3 of the drive unit 420, respectively.

Operation of Normal Condition

Referring now to a logic value table shown in FIG. 6, operation of the major circuit arrangement, shown in FIG. 5, for the first automobile multiplex data communication system 2000 under the normal condition will now be described, namely, the logic value of the signal appearing at the error terminal ERR of the signal receiver unit 410 is "0".

In the first child station 100, for instance, when the headlamp switch 103, the wiper switch 109, and the horn switch 106 are turned ON (namely, closed), the signals having the logic levels of "1" are supplied to the corresponding input terminals I1, I2 and I3 of the communication unit 101.

Subsequently, while the parent station 10 polls the first child station 100, the operation information of the operation units employed in this first child station 100 (namely, ON/OFF states of various switches) is acquired. Then, the parent station 10 judges that these headlamp switch 103, wiper switch 109, and horn switch 106 have been manipulated. Accordingly, the parent station 10 polls the fourth child station 400 to sequentially transmit drive information for causing the relevant terminal units, i.e., the headlamp 403, wiper motor 409 and horn 409 to be driven. Upon receipt of this drive information, the signal receiver unit 410 of the fourth child station 400 outputs the signals having the logic values of "1" from the output terminals 01, 02, 03 thereof. At this time, since the logic value of the signal appearing at the error terminal ERR of the signal receiver unit 410 is "0", a signal having a logic value of "1" is derived from the inverter circuit 416. As a consequence, the output terminals of the OR gate circuits 417a, 417b, and the AND gate circuit 418 output a signal having a logic value of "1", respectively. Thus, the signals having the logic values of "1" are inputted to the input terminals A1, A2, A3 of the drive unit 420. Thereafter, a signal having a logic value of "1" is outputted from the output terminals B1, B2, B3 of the drive unit 420, respectively, so that these terminal units, i.e., the headlamp 403, wiper motor 409, and horn 405 are driven.

Next, another operation of the first child station 100 when the automatic lighting switch 110 and the automatic wiper switch 111 are turned ON will now be explained. When the automatic lighting switch 110 and the automatic wiper switch 111 are turned ON, a signal having a logic value of "1" is supplied to the corresponding input terminals I0 and I4 of the communication unit 101 employed in the first child station 100.

Thereafter, the parent station 10 commences the polling operation with respect to the first child station 100 in order to acquire operation information about these switches 110 and 111. Thus, the parent station 10 judges that the automatic lighting switch 110 and the automatic wiper switch 111 have been operated. As a consequence, the parent station 10 starts an automatic light control and an automatic wiper control. In other words, when the parent station 10 judges that the present condition is "dark" based on the output from the photosensor 13, this parent station 10 transmits such a drive information for turning ON the headlamp 403 to the communication unit 401 of the fourth child station 400. Conversely, when the parent station 10 judges that the present condition is "light", the parent station 10 transmits such a drive information that the headlamp 403 is turned OFF to the communication unit 401 of the fourth child station 400. As a result, the fourth child station 400 controls to turn ON/OFF the headlamp 403 based on the above-described drive information transmitted from the parent station 10 irrelevant to the operations (namely, ON/OFF operations) of the headlamp switch 103 employed in the first child station.

Similarly, if the parent station 10 judges that the present situation is "raing" based on the output from the raindrop sensor 14, the parent station 10 transmits drive information for driving the wiper motor 409 to the communication unit 401 of the fourth child station 400. Accordingly, the wiper motor 409 connected to the drive unit 420 via the output terminal B2 is driven by the fourth child station 400 irrelevant to the operation condition of the wiper switch 109 employed in the first child station 100. Conversely, if the parent station 10 judges that the present situation is "not raing", then the parent station 10 sends such an information for stopping the wiper motor 409 to the communication unit 401 of the fourth child station 400. As a result, the wiper motor 409 is stopped under control of the drive unit 420, irrelevant to the operation condition of the wiper switch 109.

Operation of Abnormal Condition

Operation of the above-described major circuit arrangement in the first automobile multiplex data communication system 2000, when an abnormal condition, i.e., a so-called "communication error" happens to occur, will now be described with reference also to the logic value table of FIG. 6.

Such a communication error may occur, as previously described, when the multiplex data communication line "LL" is disconnected, or the data bit is changed due to electromagnetic noise.

In the case that a communication error happens to occur between the parent station 100 and the communication unit 401 of the fourth child station, because a data bit (see FIG. 4) of communication data is changed due to influences of electromagnetic noise, the signal receiver unit 410 executes the parity check in parity checken 410a. For example, when the parity bit does no correspond to the odd parity, this signal receiver unit 410 judges that such a communication error happens to occur, and thus outputs a signal having a logic level of "1" form the error terminal "ERR" (see FIG. 6). Similarly, as described before, when the communication data are not transmitted on the multiplex data transmission line "LL" for a constant time period, because of the multiplex data transmission line "LL", is disconnected, this signal receiver unit 410 judges in no-signal detector 410b that such a communication error happens to occur, and therefore outputs the signal with the logic value of "1" from the error terminal ERR. Then, a signal with a logic value of "0" is derived from the inverter circuit 416 and supplied via the AND gate circuit 418 to the drive unit 420, so that the horn 405 connected to the output terminal B3 of the drive unit 420 is compulsorily turned OFF.

On the other hand, the headlamp switch 103 of the first child station 100 is connected via the transmission line LCA to one input terminal of the AND gate circuit 422a, whereas the wiper switch 109 is connected via the transmission line LCB to one input terminal of the AND gate circuit 422 b.

When these headlamp switch 103 and wiper switch 109 are turned ON under such a communication error condition, the signals having the logic value of "1" are supplied to these input terminals of the AND gate circuits 422a and 422b, respectively. Also, the signal with the logic value of "1" is supplied from the error terminal ERR of the receiver unit 410 to the other input terminal of the respective AND gate circuits 422a and 422b. As a result, a signal having a logic value of "1" is derived from the output terminal of the respective AND gate circuits 422a and 422b. These signals with the logic values of "1" derived from the AND gate circuits 422a and 422b are furnished via the OR gate circuits 417a, 417b to the corresponding input terminals A1 and A2 of the drive unit 420, so that the headlamp 403 is turned ON and the wiper motor 409 is driven.

Under such a communication error condition. subsequently, if the headlamp switch 103 and the wiper switch 109 are turned OFF, then signals having logic values of "0" are supplied to the input terminals of these AND gate circuits 422a and 422b, respectively. As a result, signals having logic levels of "0" are outputted from these AND gate circuits 422a and 422b, and then are supplied to the OR gate circuits 417a and 417b, respectively. At this time, since the signals with the logic values of "0" are outputted from the relevant output terminals 01 and 02 of the signal receiver unit 410 to the OR gate circuits 417a, 417b, respectively, the signals with the logic values of "0" are furnished from these OR gate circuits 417a and 417b to the corresponding input terminals A1 and A2 of the drive unit 420 employed in the fourth child station 420, whereby the headlamp 403 is turned OFF and the wiper motor 409 is stopped, or disenergized.

As previously described in detail, under such a condition that the communication error happens to occur, thereafter, if the headlamp switch 103 and the wiper switch 109 are turned ON, then the headlamp 403 and the wiper motor 409 are forcibly turned ON. Similarly, under such a communication error condition, subsequently, if the headlamp switch 103 and the wiper switch 109 are turned OFF, then the headlamp 403 and the wiper motor 409 are turned OFF. That is to say, according to the merits of the first automobile multiplex data communication system 2000, no specific switch for turning OFF the headlamp 403, the wiper motor 409, or other terminal units are required.

Other Child Stations

The above-described internal arrangement of the communication unit 401 employed in the fourth child station 400 is similar to that of the communication unit 301 employed in the third child station 300. As a consequence, when the headlamp switch 103 of the first child station 100 is turned ON. Under such a communication error condition. that headlamp 303 of this third child station 300 is forcibly turned ON. Furthermore, if the headlamp switch 103 is turned OFF under such a communication error condition, then the headlamp 303 is turned OFF.

Similarly, since internal arrangements of the remaining communication units are similar to the above-explained internal arrangement of the fourth communication unit 401, when a preselected operation unit, e.g., the power window switch 604 is turned ON under such a communication error condition, the relevant terminal unit, e.g., the power window motor 602 is compulsorily turned ON. Conversely, if such a preselected operation unit is turned OFF under such a communication error, then the relevant operation unit is turned OFF.

Modifications

The present invention is not limited to the above-described preferred embodiment, but also may be changed, modified, and substituted without departing from the technical scope of the present invention.

For instance, in the above preferred embodiment, the ON-operation of the operation unit implies that the operation state of this operation unit is changed from the OFF-state into the ON-state. Alternatively, the operation state of this operation unit may be maintained under ON-state. Similarly, the operation state of this operation unit may be kept under OFF-state.

In the above-described preferred embodiment, such a communication error is detected by performing the parity check in the communication unit. Instead of such a parity check, no signal detection may be utilized to judge whether or not such a communication error happens to occur.

We claim:

1. An automobile multiplex data communications system for controlling operation of a plurality of terminal units, comprising:
   a plurality of operation units corresponding to said plurality of terminal units for operating said terminal units;
   transmission means for transmitting operation data about said operation units;
   drive means, connected to said transmission means, for driving a relevant one of said terminal units based on said operation data;
   detecting means for detecting an extraordinary state concerning transmission/reception operations of said operation data to produce an extraordinary-state detection signal; and
   control means for independently controlling the operation of said relevant one of said terminal units by logically ANDing said extraordinary-state detection signal and each of operation outputs provided from said operation units, for controlling operation of said terminal units.

2. An automobile multiplex data communications system as claimed in claim 1, further comprising:
   a multiplex data communication line and a power supply line, for connecting said transmission means, said drive means, said detecting means, and said control means, whereby said detecting means detects said extraordinary state concerning transmission/reception operations of said operation data caused by a disconnection occurring in said multiplex data communication line and said power supply line, or by electromagnetic interference occurring therein.

3. An automobile multiplex data communication system as claimed in claim 1, wherein said detecting means includes:
   a parity check means for checking parity data contained in said operation data to judge whether or not said extraordinary state concerning transmission/reception operations of said operation data happens to occur.

4. An automobile multiplex data communication system as claimed in claim 1, wherein said detecting means includes:
   a no-signal detector for detecting no signal condition during said transmission/reception operations of said operation data to judge whether or not said extraordinary state concerning transmission/reception operations of said operation data happens to occur.

5. An automobile multiplex data communication system as claimed in claim 1, wherein one of said terminal units is a headlamp of the automobile, and one of said operation units is a headlamp switch.

6. An automobile multiplex data communication system as claimed in claim 5, wherein said control means includes:
   an AND gate circuit for logically ANDing said extraordinary-state detection signal and a switching signal outputted from said headlamp switch, said switching signal being one of said operation outputs.

7. An automobile multiplex data communication system as claimed in claim 1, wherein said detecting means further includes:
   a photosensor for sensing brightness around the automobile to produce a brightness sensing signal; and
   a raindrop sensor for sensing a raindrop around the automobile to produce a raindrop sensing signal, whereby said control means performs an automatic lighting control and an automatic wiper control in response to said brightness sensing signal and said raindrop sensing signal.

* * * * *